US010894876B2

(12) United States Patent
Morishita et al.

(10) Patent No.: US 10,894,876 B2
(45) Date of Patent: Jan. 19, 2021

(54) METHOD FOR PRODUCING MODIFIED CONJUGATED DIENE-BASED POLYMER, MODIFIED CONJUGATED DIENE-BASED POLYMER, POLYMER COMPOSITION, CROSSLINKED BODY, TIRE AND COMPOUND

(71) Applicant: JSR CORPORATION, Minato-ku (JP)

(72) Inventors: Kazuya Morishita, Tokyo (JP); Mitsunori Inoue, Tokyo (JP); Daisuke Yoshii, Tokyo (JP); Yusuke Amano, Tokyo (JP)

(73) Assignee: JSR CORPORATION, Minato-ku (JP)

( * ) Notice: Subject to any disclaimer, the term of this patent is extended or adjusted under 35 U.S.C. 154(b) by 184 days.

(21) Appl. No.: 16/311,460

(22) PCT Filed: Jun. 20, 2017

(86) PCT No.: PCT/JP2017/022748
§ 371 (c)(1),
(2) Date: Dec. 19, 2018

(87) PCT Pub. No.: WO2017/221943
PCT Pub. Date: Dec. 28, 2017

(65) Prior Publication Data
US 2019/0194430 A1 Jun. 27, 2019

(30) Foreign Application Priority Data
Jun. 24, 2016 (JP) .................. 2016-125901

(51) Int. Cl.
| C08L 15/00 | (2006.01) |
| C08C 19/25 | (2006.01) |
| C08K 3/36 | (2006.01) |
| C08L 23/26 | (2006.01) |
| C08F 4/50 | (2006.01) |
| C08F 4/44 | (2006.01) |
| B60C 1/00 | (2006.01) |
| C07F 7/18 | (2006.01) |
| C08C 19/04 | (2006.01) |
| C08C 19/20 | (2006.01) |
| C08C 19/22 | (2006.01) |
| C08C 19/30 | (2006.01) |

(52) U.S. Cl.
CPC ............ *C08L 15/00* (2013.01); *B60C 1/0016* (2013.01); *B60C 1/0025* (2013.01); *C07F 7/1804* (2013.01); *C08C 19/04* (2013.01); *C08C 19/20* (2013.01); *C08C 19/22* (2013.01); *C08C 19/25* (2013.01); *C08C 19/30* (2013.01); *C08F 4/44* (2013.01); *C08F 4/50* (2013.01); *C08K 3/36* (2013.01); *C08L 23/26* (2013.01); *C08L 2205/03* (2013.01); *C08L 2310/00* (2013.01); *C08L 2312/00* (2013.01); *Y02T 10/86* (2013.01)

(58) Field of Classification Search
CPC ... B60C 1/0016; B60C 1/0025; C07F 7/1804; C08C 19/22; C08C 19/30
See application file for complete search history.

(56) References Cited

U.S. PATENT DOCUMENTS

| 3,681,287 | A | | 8/1972 | Brown et al. |
| 3,737,430 | A | * | 6/1973 | Brown .................... C03C 25/40 |
| | | | | 549/214 |
| 6,448,425 | B1 | * | 9/2002 | Gedon .................. C07F 7/1892 |
| | | | | 556/413 |
| 2003/0220513 | A1 | | 11/2003 | Gedon et al. |
| 2010/0152369 | A1 | | 6/2010 | Shibata et al. |
| 2012/0059121 | A1 | | 3/2012 | Backer et al. |

FOREIGN PATENT DOCUMENTS

| JP | 4111590 | B2 | | 7/2008 |
| JP | 2012-193277 | | * | 10/2012 |
| RU | 2011 141 341 | A | | 6/2013 |
| WO | WO 2008/123164 | A1 | | 10/2008 |

OTHER PUBLICATIONS

Machine translation of JP 2012-193277 (Year: 2012).*
Office Action dated Mar. 26, 2019 in the corresponding Korean Application No. 10-2018-7018363 with English Translation 10 pages.
Sobhani, S., et al., "Pd complex of an NNN pincer ligand supported on γ-Fe$_2$O$_3$@SiO$_2$ magnetic nanoparticles: a new catalyst for Heck, Suzuki and Sonogashira coupling reactions", New Journal of Chemistry, vol. 39, 2015, pp. 7076-7085.
STN Registry database Result, Nov. 5, 2014 1 page.
Extended European Search Report dated Jan. 27, 2020 in Patent Application No. 17815411.8, 8 pages.
Yoshitake, H. et al. "Grafting of paired 3-aminopropyltrialkoxy silanes onto mesoporous silica and adsorptions of isomers of benzenedialdehydes", Physical Chemistry Chemical Physics, vol. 15, No. 11, XP55656657, Jan. 1, 2013, pp. 3946-3954.
International Search Report dated Jul. 18, 2017, in PCT/JP2017/022748, filed Jun. 20, 2017.

(Continued)

*Primary Examiner* — Doris L Lee
(74) *Attorney, Agent, or Firm* — Oblon, McClelland, Maier & Neustadt, L.L.P.

(57) ABSTRACT

A modified conjugated diene-based polymer having high Mooney viscosity and good shape stability and exhibiting excellent processability and low heat build-up is obtained in as few steps as possible. The modified conjugated diene-based polymer is produced by a method of reacting a conjugated diene-based polymer having an active chain end, obtained by polymerizing a monomer containing a conjugated diene compound in the presence of an initiator that contains at least either of an alkali metal compound and an alkaline earth metal compound, with a compound [M] having at least two groups selected from the group consisting of a group "—C($R^1$)=N-$A^1$" and a group "—N=C($R^1$)-$A^1$", where $R^1$ is a hydrogen atom or a hydrocarbyl group and $A^1$ is a monovalent group having an alkoxysilyl group.

17 Claims, No Drawings

(56) References Cited

OTHER PUBLICATIONS

Decision to Grant dated Nov. 12, 2019 in Russian Patent Application No. 2018145510 (with English translation), 17 pages.
Combined Russian Office Action and Search Report dated Sep. 4, 2019, in Patent Application No. 2018145510, 11 pages (with English translation).
Combined Chinese Office Action and Search Report dated Feb. 6, 2020, in Patent Application No. 201780005925.7 (with English translation), 12 pages.
Office Action dated Oct. 14, 2020 in corresponding Indian patent application (Application No. 201647048802).

* cited by examiner

METHOD FOR PRODUCING MODIFIED CONJUGATED DIENE-BASED POLYMER, MODIFIED CONJUGATED DIENE-BASED POLYMER, POLYMER COMPOSITION, CROSSLINKED BODY, TIRE AND COMPOUND

TECHNICAL FIELD

The present invention relates to a method for producing a modified conjugated diene-based polymer, a modified conjugated diene-based polymer, a polymer composition, a crosslinked body, a tire and a compound.

BACKGROUND ART

Since a conjugated diene-based polymer obtained by polymerization using a conjugated diene compound is satisfactory in various characteristics such as heat resistance, abrasion resistance, mechanical strength, and processability, it has been widely used in various industrial products such as a pneumatic tire, a vibration-proof rubber, and a hose.

In rubber compositions to be used in the tread, sidewall, and the like of a pneumatic tire, in order to improve durability and abrasion resistance of the products, it is known to blend a reinforcing agent such as carbon black or silica together with a conjugated diene-based polymer. Moreover, in order to enhance affinity of the conjugated diene-based polymer to the reinforcing agent, it has been performed to use a modified conjugated diene-based polymer in which the conjugated diene-based polymer is modified with a compound containing silicone or nitrogen (e.g., see Patent Documents 1 and 2).

Patent Document 1 discloses a method for producing a modified conjugated diene-based polymer for obtaining a rubber composition having high Mooney viscosity and good shape stability in a raw rubber state and exhibiting good processability by reacting and pseudo-crosslinking a modified conjugated diene-based polymer having a weight-average molecular weight of 150,000 to 2,000,000, which has an alkoxysilyl group and a primary amino group that may be protected, with a metal halogen compound. Moreover, Patent Document 2 discloses that, after a conjugated diene monomer is polymerized or copolymerized in a hydrocarbon solvent using an organolithium compound as an initiator, a polymerization active chain end thereof is reacted with a compound having a methyleneamino group and an alkoxysilyl group such as N-(1,3-dimethylbutylidene)-3-triethoxysilyl-1-propanamine, thereby allowing the polymer to exhibit a good interaction to both of carbon black and silica.

RELATED ART

Patent Document

Patent Document 1: WO2008/123164
Patent Document 2: Japanese Patent No. 4111590

SUMMARY OF THE INVENTION

Problems to be Solved by the Invention

However, in the method of Patent Document 1, after a modified conjugated diene-based polymer having a weight-average molecular weight of 150,000 to 2,000,000, which has an alkoxysilyl group and a primary amino group that may be protected, has been obtained, a further step of reacting and pseudo-crosslinking the resulting modified conjugated diene-based polymer with a metal halogen compound is required. Therefore, the problem is that the number of steps at the production increases. In addition, the modified polymer obtained by the method of Patent Document 2 is inferior in view of dispersibility of silica. Accordingly, low heat build-up of the crosslinked rubber obtained using the modified polymer is not sufficient and there is room for further improvement.

The present disclosure is done in view of the above problems and an object is to provide a method for producing a modified conjugated diene-based polymer, wherein a modified conjugated diene-based polymer having high Mooney viscosity and good shape stability and exhibiting excellent processability and low heat build-up can be obtained in as few steps as possible, and the modified conjugated diene-based polymer to be obtained using the method for production.

Means for Solving the Problems

The present disclosure provides the following method for producing a modified conjugated diene-based polymer, modified conjugated diene-based polymer, polymer composition, crosslinked body, and tire.

A method for producing a modified conjugated diene-based polymer, which comprises reacting a conjugated diene-based polymer having an active chain end, obtained by polymerizing a monomer containing a conjugated diene compound in the presence of an initiator that contains at least either of an alkali metal compound or an alkaline earth metal compound, with a compound [M] having at least two groups selected from the group consisting of a group "—C($R^1$)=N-$A^1$" and a group "—N=C($R^1$)-$A^1$", where $R^1$ is a hydrogen atom or a hydrocarbyl group and $A^1$ is a monovalent group having an alkoxysilyl group.

A modified conjugated diene-based polymer, which is a reaction product between a conjugated diene-based polymer having an active chain end and a compound [M] having two or more groups in total of at least either of a group "—C$R^1$=N-$A^1$" or a group "—N=C$R^1$-$A^1$" (where $R^1$ is a hydrogen atom or a hydrocarbyl group and $A^1$ is a monovalent group having an alkoxysilyl group).

A polymer composition containing a modified conjugated diene-based polymer obtained by the production method according to [1] or a modified conjugated diene-based polymer according to [2], silica, and a crosslinking agent.

A crosslinked body, which is obtained by crosslinking the polymer composition according to [3].

A tire wherein at least a tread or a sidewall is formed using the polymer composition according to [3].

A compound represented by the following formula (1).

Effects of the Invention

Based on the present disclosure, a modified conjugated diene-based polymer which has high Mooney viscosity and good shape stability and which exhibits excellent processability when converted into a polymer composition without pseudo-crosslinking can be obtained. Accordingly, the modified conjugated diene-based polymer exhibiting good properties can be obtained in as few steps as possible with preventing an increase in the number of production steps. Moreover, based on the modified conjugated diene-based polymer of the present disclosure, dispersibility of silica can be made satisfactory and a crosslinked rubber having excellent low heat build-up can be obtained.

EMBODIMENTS FOR CARRYING OUT THE INVENTION

The modified conjugated diene-based polymer of the present disclosure is a reaction product between a conjugated diene-based polymer having an active chain end and a compound [M] having at least two groups selected from the group consisting of a group "—C($R^1$)=N-$A^1$" and a group "—N=C($R^1$)-$A^1$", where $R^1$ is a hydrogen atom or a hydrocarbyl group and $A^1$ is a monovalent group having an alkoxysilyl group. The modified conjugated diene-based polymer can be produced by the method including the following polymerization step and modification step. The following will describe the items relating to the embodiments of the present disclosure in detail.

<Polymerization Step>

This step is a step of polymerizing a monomer containing a conjugated diene compound to obtain a conjugated diene-based polymer having an active chain end. Examples of the conjugated diene compound to be used for the polymerization include 1,3-butadiene, isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene and 2-chloro-1,3-butadiene. Among these, 1,3-butadiene, isoprene, and 2,3-dimethyl-1,3-butadiene are preferable.

The conjugated diene-based polymer may be a homopolymer of the conjugated diene compound, but is preferably a copolymer of the conjugated diene compound and an aromatic vinyl compound from the viewpoint of improving the strength of the resulting rubber. Examples of the aromatic vinyl compound to be used for the polymerization include styrene, 2-methylstyrene, 3-methylstyrene, 4-methylstyrene, α-methylstyrene, 2,4-dimethylstyrene, 2,4-diisopropylstyrene, 4-t-butylstyrene, 5-t-butyl-2-methylstyrene, vinylethylbenzene, divinylbenzene, trivinylbenzene, divinylnaphthalene, t-butoxystyrene, vinylbenzyldimethylamine, (4-vinylbenzyl) dimethylaminoethyl ether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinylpyridine, diphenylethylene and a tertiary amino group-containing diphenylethylene (e.g., 1-(4-N,N-dimethylaminophenyl)-1-phenylethylene). Of these, as the aromatic vinyl compound, styrene and α-methylstyrene are particularly preferable.

When the conjugated diene-based polymer is a copolymer of the conjugated diene compound and the aromatic vinyl compound, it is preferable that the copolymer is a polymer containing 1,3-butadiene and styrene in the monomer composition in view of high livingness during anionic polymerization. The above copolymer preferably has a randomly copolymerized portion in which the conjugated diene compound and the aromatic vinyl compound are irregularly distributed. The above copolymer may further have a block portion composed of a conjugated diene compound or an aromatic vinyl compound.

When the conjugated diene-based polymer is a copolymer of the conjugated diene compound and the aromatic vinyl compound, the use ratio of the aromatic vinyl compound to the total amount of the conjugated diene compound and the aromatic vinyl compound used for polymerization is preferably 3 to 55% by mass, and more preferably 5 to 50% by mass, from the viewpoint that the low hysteresis loss and the wet skid resistance of the resulting crosslinked polymer are well-balanced. Incidentally, in the polymer, the content ratio of the structural unit derived from the aromatic vinyl compound is a value determined by $^1$H-NMR. Each of the conjugated diene compounds and the aromatic vinyl compounds may be used alone or two or more thereof in combination.

At the polymerization, a compound other than the conjugated diene compound and the aromatic vinyl compound (hereinafter also referred to as "other monomer") may also be used. Examples of the other monomer include acrylonitrile and methyl (meth)acrylate, ethyl (meth)acrylate. The use ratio of the other monomer to the total amount of the monomers to be used for polymerization is preferably 10% by mass or less, and more preferably 5% by mass.

In the polymerization method to be used, any of a solution polymerization method, a vapor-phase polymerization method, or a bulk polymerization method may be used, but a solution polymerization method is particularly preferable. Moreover, in a polymerization mode, either of a batch-wise mode and a continuous mode may be used. Examples of a specific polymerization method include a method of polymerizing the monomer containing the conjugated diene compound in an organic solvent in the presence of an initiator and a randomizer that is used as needed.

At least either of an alkali metal compound and an alkaline-earth metal compound may be used as an initiator. Examples thereof include alkyllithiums such as methyllithium, ethyllithium, n-propyllithium, n-butyllithium, sec-butyllithium, and tert-butyllithium, 1,4-dilithiobutane, phenyllithium, stilbenelithium, naphthyllithium, 1,3-bis(1-lithio-1,3-dimethylpentyl)benzene, 1,3-phenylene-bis(3-methyl-1-phenylpentylidene)dilithium, naphthylsodium, naphthylpotassium, di-n-butylmagnesium, di-n-hexylmagnesium and ethoxypotassium, calcium stearate. Of these, lithium compounds are preferable. The total amount of the polymerization initiator to be used is preferably 0.2 to 20 mmol, with respect to 100 g of the monomer to be used in the polymerization.

The polymerization reaction may be performed using a mixture of at least either of an alkali metal compound and an alkaline-earth metal compound and a compound having a functional group that interacts with silica, as the initiator. By performing the polymerization in the presence of the mixture, the polymerization initiation terminal of the conjugated diene-based polymer can be modified with the functional group that interacts with silica. Incidentally, the term "functional group that interacts with silica" used herein refers to a group having at least one element such as nitrogen, sulfur, phosphorus, or oxygen that interacts with silica. The term "interaction" means that a covalent bond is formed between molecules, or an intermolecular force (intermolecular electromagnetic force such as ion-dipole interaction, dipole-dipole interaction, a hydrogen bond, or Van der Waals force) that is weaker than a covalent bond is formed.

The compound having a functional group that interacts with silica, which is used for modification of the polymerization initiation terminal, is particularly preferably a nitrogen-containing compound such as secondary amine compound. Examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine and 1,3-ditrimethylsilyl-1,3,5-triazinane.

Incidentally, when the polymerization in the presence of the above mixture is performed, at least either of the alkali metal compound and the alkaline-earth metal compound may be previously mixed with the compound having a functional group that interacts with silica, the resulting mixture may be added to the polymerization system, and then the polymerization may be performed. Alternatively, at least either of the alkali metal compound and the alkaline-earth metal compound and the compound having a functional group that interacts with silica may be added to the polymerization system, and mixed in the polymerization system, and then the polymerization may be performed. Both these cases are included in the embodiment of "polymerizing a monomer containing a conjugated diene compound in the presence of an initiator that contains at least one of an alkali metal compound and an alkaline earth metal compound".

A randomizer can be used for the purpose of adjusting a vinyl bond content, which indicates a content ratio of vinyl bonds in the polymer. Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine and tetramethylethylenediamine. One of these compounds may be used alone or two or more thereof in combination.

The organic solvent to be used for polymerization may be an organic solvent that is inert to the reaction. For example, an aliphatic hydrocarbon, an alicyclic hydrocarbon or an aromatic hydrocarbon can be used. Of these, a hydrocarbon having 3 to 8 carbon atoms is preferable and examples thereof include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene and cyclohexene. Incidentally, as the organic solvent, one of the solvents may be used alone or two or more thereof in combination.

In the case of using the solution polymerization method, the monomer concentration in the reaction solvent is preferably 5 to 50% by mass, and more preferably 10 to 30% by mass, from the viewpoint of maintaining the balance between productivity and easiness of polymerization control. The polymerization reaction temperature is preferably −20 to 150° C., and more preferably 0 to 120° C. It is preferable to perform the polymerization reaction under a pressure sufficient to substantially maintain the monomer in a liquid phase. Such a pressure may be achieved by a method of pressurizing the reactor using an inert gas to the polymerization reaction, for example.

The conjugated diene-based polymer having an active chain end can be obtained by such a polymerization reaction. The weight average molecular weight (Mw) of the resulting conjugated diene-based polymer in terms of polystyrene, which is determined by gel permeation chromatography (GPC), is preferably $5.0 \times 10^4$ to $1.0 \times 10^6$. When the Mw is less than $5.0 \times 10^4$, the tensile strength, low heat build-up, and abrasion resistance of the crosslinked polymer are prone to decrease. When the Mw is more than $1.0 \times 10^6$, the processability of the rubber composition obtained using the modified polymer tends to decrease. Mw is more preferably $8.0 \times 10^4$ to $8.0 \times 10^5$, and still more preferably $1.0 \times 10^5$ to $5.0 \times 10^5$.

Regarding the conjugated diene-based polymer having an active chain end, the vinyl bond content in the butadiene unit is preferably 30 to 70% by mass, more preferably 33 to 68% by mass, and still more preferably 35 to 65% by mass. When the vinyl bond content is less than 30% by mass, the grip performance tends to decrease. When the vinyl bond content exceeds 70% by mass, the abrasion resistance of the resulting vulcanized rubber tends to decrease. Incidentally, the term "vinyl bond content" used herein is a value showing a content ratio of the structural unit having a 1,2-bond to the total structural units of butadiene in the conjugated diene-based polymer and is a value measured by $^1$H-NMR.

<Modification Step>

In this step, the active chain end of the conjugated diene-based polymer obtained by the above polymerization step is reacted with the compound [M]. By using a compound having at least two groups selected from the group consisting of a group "—C($R^1$)=N-$A^1$" and a group "—N=C($R^1$)-$A^1$", where $R^1$ is a hydrogen atom or a hydrocarbyl group and $A^1$ is a monovalent group having an alkoxysilyl group (hereinafter also referred to as "specific imino group") as a modifier, a modified conjugated diene-based polymer which has a large number of branches of polymer chains and is modified with a group that interacts with silica can be obtained through the modification step.

In the specific imino group, examples of the hydrocarbyl group of $R^1$ include an alkyl group having 1 to 20 carbon atoms, a cycloalkyl group having 3 to 20 carbon atoms, an alkenyl group having 2 to 20 carbon atoms and an aryl group having 6 to 20 carbon atoms. As long as $A^1$ has an alkoxysilyl group, the structure except for the group in $A^1$ is not particularly limited, but $A^1$ is preferably a group further having a methylene group or a polymethylene group, and more preferably a group which has a methylene group or a polymethylene group and an alkoxysilyl group and is bound to the nitrogen atom or carbon atom that constitutes the carbon-nitrogen double bond with the methylene group or polymethylene group. The number of the specific imino groups in the compound [M] is sufficiently 2 or more, and preferably 2 to 6. Incidentally, a plurality of $R^1$ and $A^1$ in the compound [M] may be the same or different.

Particularly, the compound [M] is preferably a compound represented by the following formula (1):

[Chem 1]

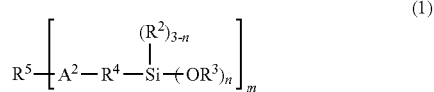

wherein $R^2$ and $R^3$ are each independently a hydrocarbyl group having 1 to 20 carbon atoms, $R^4$ is an alkanediyl group having 1 to 20 carbon atoms, $A^2$ is a group "*—C($R^1$)=N—" or a group "*—N=C($R^1$)—" (where $R^1$ is a hydrogen atom or a hydrocarbyl group and "*" represents that it is a bond to be bound to $R^5$); $R^5$ is an m-valent hydrocarbyl group having 1 to 20 carbon atoms or an m-valent group having 1 to 20 carbon atoms, which has at least one atom selected from the group consisting of a nitrogen atom, an oxygen atom, and a sulfur atom and does not have an active hydrogen; n is an integer of 1 to 3 and m is an integer of 2 to 10; and a plurality of $R^2$, $R^3$, $R^4$, $A^2$, and n may be the same or different.

In the above formula (1), examples of the hydrocarbyl groups of $R^2$ and $R^3$ include an alkyl group or an allyl group having 1 to 20 carbon atoms, a cycloalkyl group having 3 to 20 carbon atoms and an aryl group having 6 to 20 carbon atoms. Examples of the hydrocarbylene groups of $R^4$ include an alkanediyl group having 1 to 20 carbon atoms, a cycloalkylene group having 3 to 20 carbon atoms and an arylene group having 6 to 20 carbon atoms. $R^4$ is preferably linear.

The above explanation is applied to $R^1$ in $A^2$. n is preferably 2 or 3, and more preferably 3 in view of high effect of improving silica dispersibility.

Examples of the m-valent hydrocarbyl group of $R^5$ include a group resulting from removal of m pieces of hydrogen atoms from a linear hydrocarbon having 1 to 20 carbon atoms, an alicyclic hydrocarbon having 3 to 20 carbon atoms, and an aromatic hydrocarbon having 6 to 20 carbon atoms. In view of high effect of improving the abrasion resistance of the resulting vulcanized rubber, preferred is a group (aromatic ring group) resulting from removal of m pieces of hydrogen atoms from the ring part of the aromatic hydrocarbon. Examples of the aromatic hydrocarbon include a ring structure represented by the following formula (2) and a multi-ring structure in which two or more ring structures are linked (e.g., a biphenyl group):

[Chem 2]

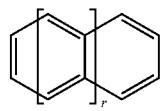

(2)

wherein r is an integer of 0 to 5.

Preferable examples of $R^5$, which is an m-valent group having 1 to 20 carbon atoms, which has at least one atom selected from the group consisting of a nitrogen atom, an oxygen atom, and a sulfur atom and does not have an active hydrogen, include an m-valent heterocyclic group and an m-valent group having a tertiary amine structure. The heterocyclic ring group preferably has a conjugated system and, examples thereof include a group resulting from removal of m pieces of hydrogen atoms from a single ring or condensed ring, such as pyridine, pyrimidine, pyrazine, quinoline, naphthalidine, furan, or thiophene, and a ring part of a structure in which a plurality of the single rings or condensed rings.

m is an integer of 2 to 10. m is preferably 2 to 6 from the viewpoint of processability of the rubber composition. Incidentally, the term "active hydrogen" used herein refers to a hydrogen atom that is bound to an atom other than a carbon atom, and preferably refers to a hydrogen atom that has a bonding energy lower than that of the carbon-hydrogen bond of polymethylene.

Examples of the compound [M] include compounds represented by the respective following formulae (M-1) to (M-23). Incidentally, one of the compounds [M] may be used alone or two or more thereof in combination. Note that $R^7$ in the formula (M-11) represents a hydrogen atom or an alkyl group.

[Chem 3]

(M-1)

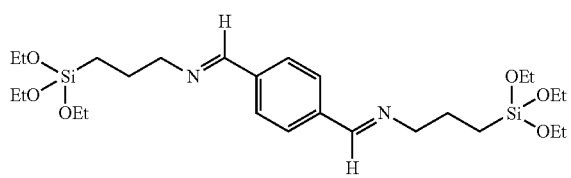

(M-2)

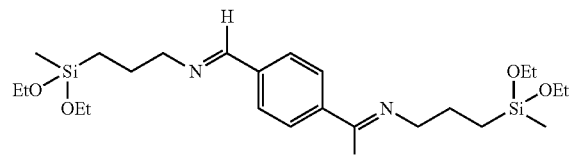

(M-3)

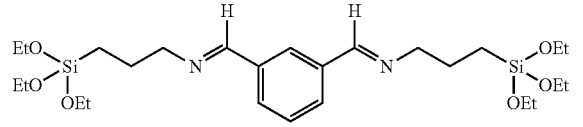

(M-4)

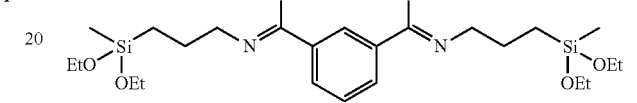

(M-5)

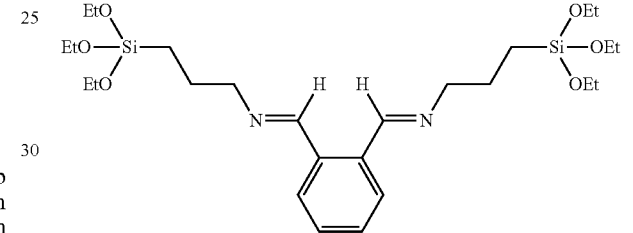

(M-6)

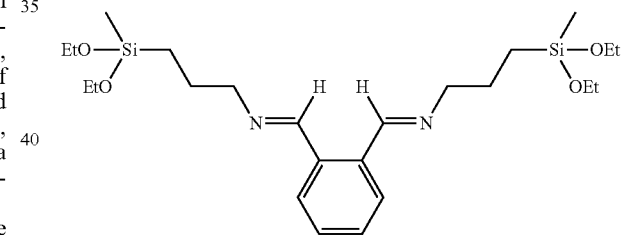

[Chem 4]

(M-7)

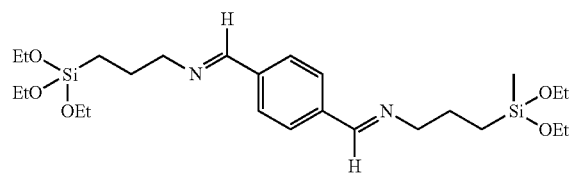

(M-8)

(M-9)

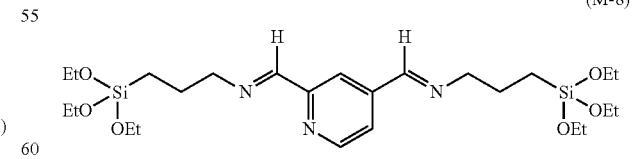

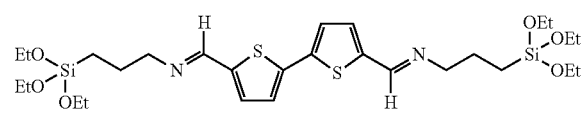
(M-10)
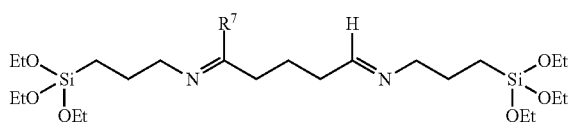
(M-11)
(M-12)
[Chem 5]
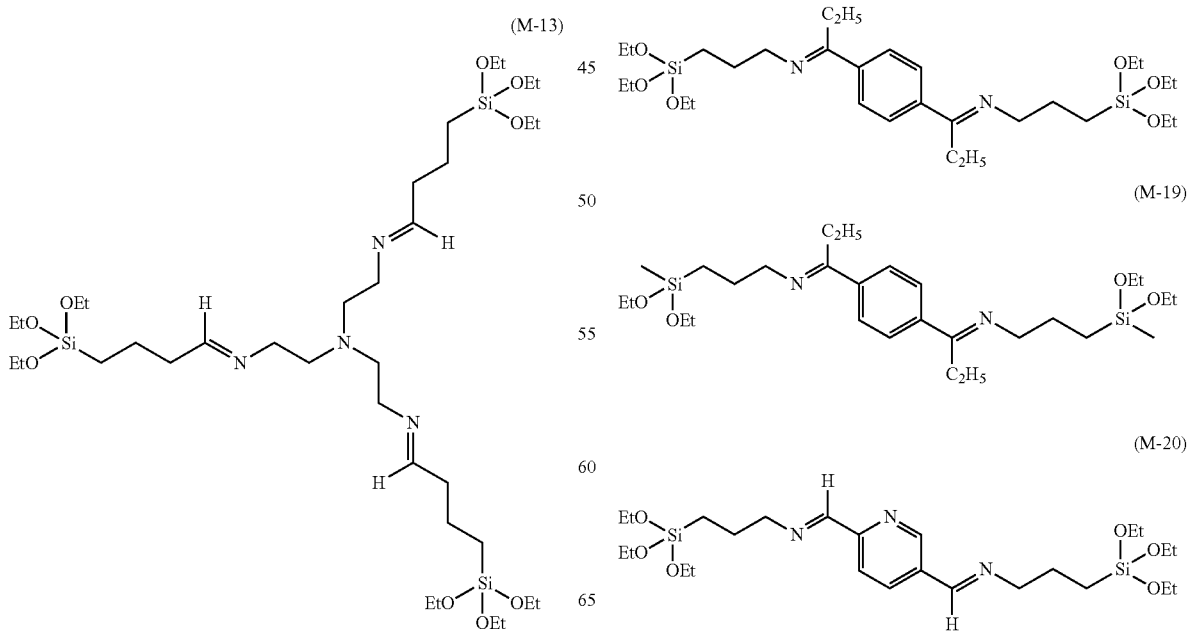
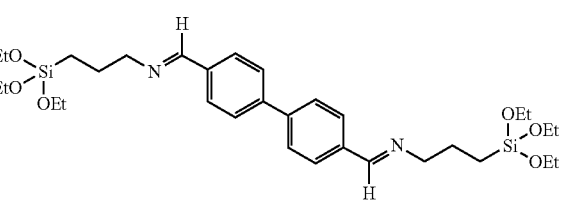
(M-14)
(M-15)
(M-16)
(M-17)
[Chem. 6]
(M-18)
(M-19)
(M-20)

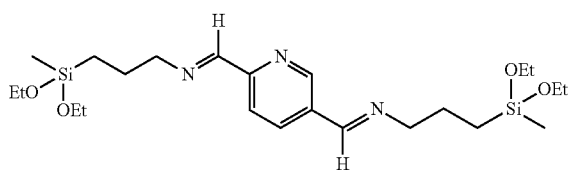
(M-21)

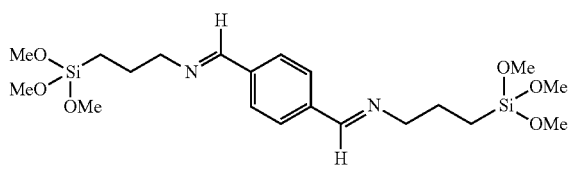
(M-22)

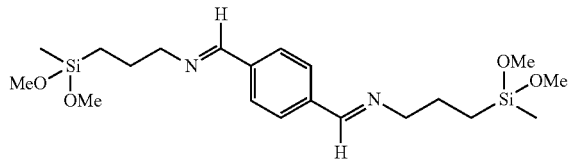
(M-23)

The compound [M] can be synthesized by appropriately combining usual methods used in organic chemistry. Examples of methods for obtaining the compounds represented by the above formula (1) include (i) a method of dehydrative condensation of a monofunctional amine compound having an alkoxysilyl group and $R^4$ (e.g., 3-aminopropyltriethoxysilane, 3-aminopropylmethyldiethoxysilane) and a polyfunctional aldehyde compound having $R^5$ (e.g., terephthalaldehyde, isophthalaldehyde, phthaldialdehyde, 2,4-pyridinedicarboxyaldehyde) and (ii) a method of dehydrative condensation of a polyfunctional amine compound having $R^5$ (e.g., tris(2-aminoethyl)amine, N,N'-bis(2-aminoethyl)methylamine) and a monofunctional hydroxyl group-containing compound having an alkoxysilyl group and $R^4$ (e.g., 4-(triethoxysilyl)butanal). These synthetic reactions are performed preferably in an appropriate organic solvent, if necessary, in the presence of an appropriate catalyst. However, the synthetic method of the compound [M] is not limited to the above methods.

The reaction of the conjugated diene-based polymer having an active chain end with the compound [M] may be a solution reaction. The use ratio of the compound [M] (when two or more compounds are used, a total amount thereof) is preferably 0.01 mol or more, and more preferably 0.05 mol or more with respect to 1 mol of the metal atom that is contained in the polymerization initiator and involved in the polymerization, from the viewpoint of sufficient proceeding of the modification reaction. Moreover, in order to avoid excessive addition, an upper limit value thereof is preferably less than 2.0 mol, and more preferably less than 1.5 mol, with respect to 1 mol of the metal atom that is contained in the polymerization initiator and involved in the polymerization.

The temperature of the modification reaction is usually the same as in the polymerization reaction and is preferably −20° C. to 150° C., and more preferably 0 to 120° C. When the reaction temperature is low, the viscosity of the polymer after modification tends to increase and, when the reaction temperature is high, the active chain end is prone to be deactivated. The reaction time is preferably 1 minute to 5 hours, and more preferably 2 minutes to 1 hour.

In the reaction of the conjugated diene-based polymer having an active chain end with the compound [M], another modifier or coupling agent may be used together with the compound [M]. Another modifier or coupling agent is not particularly limited as long as they are compounds capable of reacting with the active chain end of the conjugated diene-based polymer to be obtained by the above polymerization, and a known compound as a modifier or a coupling agent for the conjugated diene-based polymer can be used. When another modifier or coupling agent is used, the use ratio thereof is preferably 10% by mol or less, and more preferably 5% by mol or less.

The modified conjugated diene-based polymer contained in the reaction solution may be isolated by performing a known solvent removal method such as steam stripping and a drying operation such as heat treatment, for example. In the modified conjugated diene-based polymer of the present disclosure, the weight average molecular weight is preferably $1.5 \times 10^5$ to $2.0 \times 10^6$ from the viewpoint of achieving both of obtaining a modified conjugated diene-based polymer having sufficiently high Mooney viscosity and good shape stability and obtaining a rubber composition having excellent processability. More preferred is $1.8 \times 10^5$ to $1.5 \times 10^6$ and still more preferred is $2.0 \times 10^5$ to $1.2 \times 10^6$. Incidentally, the weight average molecular weight of the modified conjugated diene-based polymer is a value determined from the maximum peak molecular weight on the GPC curve measured by GPC after the reaction of the conjugated diene-based polymer having an active chain end with the compound [M].

On a GPC curve obtained by GPC after the reaction of the conjugated diene-based polymer having an active chain end with the compound [M], AT/AL, the ratio of area (AT) of peak portion(s) showing 2.5 times or more peak top molecular weight than the peak top molecular weight at a peak having the smallest molecular weight to the total peak area (AL) of the GPC curve (hereinafter also referred to as "coupling ratio of three branches or more"), is preferably 40% or more. When the ratio is 40% or more, a modified conjugated diene-based polymer having sufficiently high Mooney viscosity and sufficiently low cold flow value is obtained, so that the case is preferable. From such a viewpoint, the coupling ratio of three branches or more is more preferably 45% or more, still more preferably 50% or more, and particularly preferably 55% or more.

The peak top molecular weight at a peak having the smallest molecular weight, which is measured by GPC after the reaction of the conjugated diene-based polymer having an active chain end with the compound [M], is preferably in the range of $5.0 \times 10^4$ to $1.0 \times 10^6$, more preferably in the range of $8.0 \times 10^4$ to $8.0 \times 10^5$, and still more preferably in the range of $1.0 \times 10^5$ to $5.0 \times 10^5$.

The thus obtained modified conjugated diene-based polymer has a branched structure in which a modified or unmodified conjugated diene-based polymer chain is bound to a plurality of reaction sites (carbon-nitrogen double bond(s) (C=N group(s) and alkoxysilyl group(s)) contained in the compound [M]. The number of branches of polymer chains per molecule of the resulting modified conjugated diene-based polymer is preferably 3 or more, and more preferably in the range of 3 to 20 from the viewpoint of sufficiently high Mooney viscosity and good cold flow of the resulting modified conjugated diene-based polymer. Incidentally, because the C=N group has higher reactivity than the alkoxysilyl group and thus preferentially reacts with the active chain end of the conjugated diene-based polymer, it is considered that the number of remaining alkoxysilyl groups increases, the interaction between the resulting modified conjugated diene-based polymer and silica is improved, and thereby excellent low heat build-up are exhibited.

The modified conjugated diene-based polymer of the present disclosure is represented by the following formula (3):

[Chem 7]

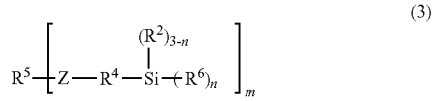
(3)

wherein $R^2$ is a hydrocarbyl group having 1 to 20 carbon atoms, $R^6$ is a hydrocarbyloxy group having 1 to 20 carbon atoms or a modified or unmodified conjugated diene-based polymer chain, $R^4$ is an alkanediyl group having 1 to 20 carbon atoms, and Z is a group represented by the following formula (4) or (5); $R^5$ is an m-valent hydrocarbyl group having 1 to 20 carbon atoms or an m-valent group having 1 to 20 carbon atoms, which has at least one atom selected from the group consisting of a nitrogen atom, an oxygen atom, and a sulfur atom and does not have an active hydrogen; n is an integer of 1 to 3 and m is an integer of 2 to 10; and a plurality of $R^2$, $R^4$, $R^6$, Z, and n may be the same or different:

[Chem 8]

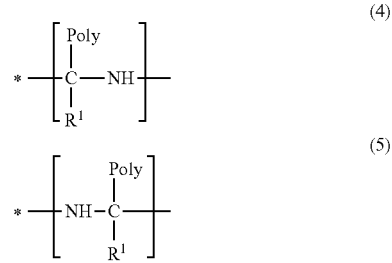

wherein $R^1$ is a hydrogen atom or a hydrocarbyl group and Poly is a modified or unmodified conjugated diene-based polymer chain; and "*" represents a bond to be bound to $R^5$.

In the above formulae (3) (4) and (5), the explanations for the aforementioned formula (1) are applied to $R^1$, $R^2$, $R^4$, and $R^5$. The hydrocarbyloxy group of $R^6$ is preferably an ethoxy group or a methoxy group. The conjugated diene-based polymer chain of $R^6$ and Poly, the conjugated diene-based polymer chain in the formulae (4) and (5), are structures corresponding to the conjugated diene-based polymer having an active chain end, which is obtained in the aforementioned polymerization step. These conjugated diene-based polymer chains may have a functional group that interacts with silica, at the end part.

<Polymer Composition>

The polymer composition of the present disclosure contains the above modified conjugated diene-based polymer, silica, and a crosslinking agent. The content ratio of the modified conjugated diene-based polymer to the polymer composition is preferably 10% by mass or more, more preferably 20% by mass or more, and still more preferably 25% by mass or more with respect to the total amount of the polymer composition. An upper limit value of the modified conjugated diene-based polymer is preferably 50% by mass or less, and more preferably 40% by mass or less.

Examples of silica include wet silica (hydrated silica), dry silica (silicic anhydride), colloidal silica, precipitated silica, calcium silicate and aluminum silicate. Of these, wet silica is particularly preferable from the viewpoint of improving fracture resistance and achieving both of the wet grip properties and the low rolling resistance. High dispersible type silica is also preferably used from the viewpoint that the dispersibility of the silica in the polymer composition, physical properties and processability can be improved. Incidentally, one of the silica may be used alone or two or more thereof in combination.

Various reinforcing fillers such as carbon black, clay, and calcium carbonate may be blended into the polymer composition, in addition to silica. Preferred is to use silica alone or carbon black and silica in combination. The total amount of silica and carbon black in the polymer composition is preferably 20 to 130 parts by mass, more preferably 25 to 110 parts by mass with respect to 100 parts by mass of the total amount of the polymer components contained in the polymer composition.

Examples of the crosslinking agent include sulfur, sulfur halides, organic peroxides, quinone dioximes, organic polyamine compounds and methylol group-containing alkylphenol resins, and sulfur is normally used. The amount of sulfur to be blended is preferably 0.1 to 5 parts by mass, and more preferably 0.5 to 3 parts by mass, with respect to 100 parts by mass of the total amount of the polymer components contained in the polymer composition.

In addition to the modified conjugated diene-based polymer obtained above, another rubber component may be blended into the polymer composition of the present disclosure. Examples of the rubber component include but not limited to butadiene rubber (BR, e.g., high-cis BR having 90% or more of cis-1,4-bond, syndiotactic-1,2-polybutadiene (SPB)-containing BR, etc.), styrene-butadiene rubber (SBR), natural rubber (NR), isoprene rubber (IR), styrene-isoprene copolymer rubber, butadiene-isoprene copolymer rubber, and more preferred are BR and SBR. The content ratio of another rubber component in the polymer composition is preferably 60% by mass or less, more preferably 50% by mass or less with respect to the total amount of the above modified conjugated diene-based polymer and another rubber component.

Into the polymer composition, a process oil which is generally used for oil extension of an elastomer may be blended as an oil for oil extension. The process oil is, for example, blended into a rubber composition by directly adding the oil during blending rubber. Preferable process oils include various oils known in the art such as aromatic-compound base oils, paraffinic base oils, naphthenic base oils, vegetable oils, and oils having low content of polycyclic aromatic compounds (low PCA oils), e.g., mild extraction solvates (MES), oils obtained by treating an aromatic extract from distillates (TDAE: treated distillate aromatic extract), special aromatic extract from residual oils (SRAE: special residual aromatic extract), heavy naphthenic base oils. Examples of commercially available MES, TDAE, and SRAE include Catenex SNR (heavy paraffin obtained by dewaxing a distillate with a solvent) manufactured by Shell as MES, Vivatec 500 manufactured by H&R Wasag AG as TDAE, NC 140 manufactured by Japan Energy Corp. as SRAE. The amount of the process oil to be blended is preferably 10 to 100 parts by mass with respect to 100 parts by mass of the total amount of the polymer component contained in the polymer composition.

Various additives which is generally used in the rubber composition for tire, such as an antioxidant, zinc oxide, stearic acid, a softening agent, sulfur, a vulcanization accelerant, a silane coupling agent, a compatibilizing agent, a vulcanization assistant, a processing aid, and a scorch retardant may be blended into the polymer composition, in addition to the above-described components. Depending on various components, the blending ratios thereof may be appropriately selected in the ranges where the effects of the present disclosure are not impaired.

The crosslinked body of polymer composition of the present disclosure, which is obtained by kneading the polymer component, silica, the crosslinking agent, and component(s) to be added as needed using a kneader such as an open-type kneader (e.g., roll) or closed-type kneader (e.g., Banbury mixer), followed by crosslinking (vulcanization) after molding, is applicable, to various rubber products. Specifically, the above crosslinked body can be applied for tires such as treads, undertreads, carcasses, sidewalls, and beads; seals such as packings, gaskets, weatherstrippings, and O-rings; interior and exterior skins for various vehicles such as automobiles, ships, aircrafts, and railways; building materials; anti-vibration rubbers for industrial machines and facilities; various hoses and hose covers such as diaphragms, rolls, radiator hoses, and air hoses; belts such as power transmission belts; linings; dust boots; materials for medical equipments; fenders; insulating materials for electric wires; and other industrial products.

Based on the method for producing a modified conjugated diene-based polymer of the present disclosure, the modified conjugated diene-based polymer having high Mooney viscosity and good shape stability and exhibiting good processability when transformed into a polymer composition can be obtained, and the modified conjugated diene-based polymer maintains good physical properties required for tires, such as low heat build-up and abrasion resistance. Therefore, a polymer composition containing the modified conjugated diene-based polymer obtained based on the present disclosure can be suitably used as a material for the treads and sidewalls of tires.

The production of tires can be performed according to usual methods. For example, the polymer composition is mixed in a kneader and formed into a sheet. The sheet is disposed at a predetermined position (for example, outside a carcass in the case of a sidewall) and then the sheet is vulcanized and molded to thereby be formed into a tread rubber or a sidewall rubber according to usual methods. Therefore, a pneumatic tire is obtained.

EXAMPLES

The following will specifically describe the present disclosure based on Examples but the disclosure is not limited to these Examples. Incidentally, "part(s)" and "%" in Examples and Comparative Examples are on the basis of mass, unless otherwise specified. The following will show measurement methods of various physical property values.

[Characterization of Polymer]
Vinyl content (%): it was measured by 400 MHz $^1$H-NMR.
Bound styrene content (%): it was measured by 400 MHz $^1$H-NMR.
Weight average molecular weight of polymer before modification reaction (peak molecular weight before modification reaction): it was determined, in terms of polystyrene, from the retention time corresponding to the vertex of a peak having the smallest molecular weight on the gel permeation chromatography (GPC) curve obtained using GPC (Viscotek TDA302 (trade name (manufactured by Viscotek Co.)) under the following measurement conditions after the modification reaction with a modifier or a coupling agent. Incidentally, the peak having the smallest molecular weight is a peak derived from a polymer excluding polymers whose molecular weight was increased by the reaction with the modifier or the coupling agent.

(GPC Measurement Conditions)
Column: trade name "TSK gel HHR-H" (manufactured by Tosoh Corporation), two columns
Column temperature: 40° C.
Mobile phase: tetrahydrofuran
Flow rate: 1.0 ml/minute
Sample concentration: 10 mg/20 ml Weight average molecular weight of polymer after modification reaction: it was determined, in terms of polystyrene, from retention time corresponding to the vertex of the maximum peak on the GPC curve obtained above.

Coupling ratio (%) of three branches or more: on the GPC curve obtained above, the ratio of area of peak portion(s) showing 2.5 times or more peak top molecular weight than the peak top molecular weight at a peak having the smallest molecular weight to the total area derived from the polymer of the GPC curve was taken as the coupling ratio (%) of three branches or more.

Mooney viscosity ($ML_{1+4}$, 100° C.): it was determined in accordance with JIS K6300 and using an L rotor under conditions of a preheating time of 1 minute, a rotor operation time of 4 minutes and a temperature of 100° C.

Cold flow (C/F): cold flow was measured by extruding a polymer through a ¼-inch orifice under a pressure of 3.5 pounds/square inch at a temperature of 50° C. After allowing to stand for 10 minutes to be a steady state, the extrusion speed was measured and the value was expressed as grams per minute (g/min). Incidentally, the cold flow value shows that, the smaller the value is, the better the shape stability (storage stability) is.

[Characterization of Polymer Composition (Blended Rubber)]
Blend Mooney viscosity: it was determined in accordance with JIS K6300 and using an L rotor under conditions of a preheating time of 1 minute, a rotor operation time of 4 minutes, and a temperature of 100° C. It was represented as an index and, the larger the value is, the better the processability is.

[Characterization of Vulcanized Rubber]
70° C. tan δ: It was measured using a vulcanized rubber as a sample for measurement using a dynamic spectrometer (manufactured by US Rheometrics, Inc.) under conditions of a tensile dynamic strain of 0.7%, an angular velocity of 100 radian/second, and 70° C. It was represented as an index and, the larger the value is, the smaller the rolling resistance is and the better the low heat build-up is.

DIN abrasion test: It was measured using a vulcanized rubber as a sample for measurement using a DIN abrasion tester (manufactured by Toyo Seiki Seisaku-sho, Ltd.) under a load of 10 N at 25° C. in accordance with JIS K6264. It was represented as an index and, the larger the numerical value is, the better the abrasion resistance is.

Incidentally, the modifiers (compound (M-1) to compound (M-13)) used in Examples correspond to the above formulae (M-1) to (M-13) exemplified above as compounds [M], respectively.

Synthesis of Compound [M]

Example 1A Synthesis of Compound (M-1)

Into an 100 mL eggplant-shaped flask were charged 80 mL of toluene as a solvent, 4.55 g (33.92 mmol) of terephthalaldehyde, and 15.02 g (67.84 mmol) of 3-aminopropyltriethoxysilane, and refluxed at 120° C. using a Dean-Stark apparatus. After water was all removed outside, refluxing was further continued for 2 hours. Thereafter, filtration was performed through a filter and the toluene solvent was distilled off under reduced pressure. After the purity of the product was estimated based on $^1$H-NMR spectral analysis and GC/MS analysis, the product was used as it was as a modifier for a modified conjugated diene-based polymer.

$^1$H-NMR (solvent: CDCl$_3$) chemical shift δ: 8.26 ppm (N=C$\underline{H}$-Ph, 2H), 7.73 ppm (hydrogen on benzene ring, 4H), 3.80 ppm (CH$_3$—C$\underline{H}_2$—O—, 12H), 3.61 ppm (Si—CH$_2$—CH$_2$—C$\underline{H}_2$—N, 4H), 1.83 ppm (Si—CH$_2$—C$\underline{H}_2$—CH$_2$—N, 4H), 1.20 ppm (C$\underline{H}_3$—CH$_2$—O, 18H), 0.67 ppm (Si—C$\underline{H}_2$—CH$_2$—CH$_2$—N, 4H)

Examples 2a to 13A

The same operations as in Example 1A were performed except for the kinds and charged amounts of the compounds to be used for the synthesis of the compound [M] as shown in the following Table 1 to synthesize compounds (M-2) to (M-13), respectively. $^1$H-NMR peaks of the compounds (M-2), (M-8), (M-9), and (M-10) were as follows.

Compound (M-2)

$^1$H-NMR (solvent: CDCl$_3$) chemical shift δ: 8.67 ppm (N=C$\underline{H}$-Ph, 2H), 8.10 ppm (hydrogen on benzene ring, 4H), 3.83 ppm (CH$_3$—C$\underline{H}_2$—O—, 8H), 3.71 ppm (Si—CH$_2$—CH$_2$—C$\underline{H}_2$—N, 4H), 1.70 ppm (Si—CH$_2$—C$\underline{H}_2$—CH$_2$—N, 4H), 1.21 ppm (C$\underline{H}_3$—CH$_2$—O, 12H), 1.02 ppm (Si—C$\underline{H}_2$—CH$_2$—CH$_2$—N, 4H), 0.14 ppm (C$\underline{H}_3$—Si, 6H)

Compound (M-8)

$^1$H-NMR (solvent: CDCl$_3$) chemical shift δ: 8.89 to 7.94 ppm (hydrogen on pyridine ring, 3H), 8.28 to 7.50 ppm (N=C$\underline{H}$-Py, 2H), 3.83 ppm (CH$_3$—C$\underline{H}_2$—O—, 12H), 1.49 ppm (Si—CH$_2$—CH$_2$—C$\underline{H}_2$—N, 4H), 1.40 ppm (Si—CH$_2$—C$\underline{H}_2$—CH$_2$—N, 4H), 1.21 ppm (C$\underline{H}_3$—CH$_2$—O, 18H), 0.58 ppm (Si—C$\underline{H}_2$—CH$_2$—CH$_2$—N, 4H))

Compound (M-9)

$^1$H-NMR (solvent: CDCl$_3$) chemical shift δ: 7.50 ppm (N=C$\underline{H}$—Fr, 2H), 6.54 ppm (hydrogen on furan ring, 2H), 3.83 ppm (CH$_3$—C$\underline{H}_2$—O, 8H), 1.49 ppm (Si—CH$_2$—CH$_2$—C$\underline{H}_2$—N, 4H), 1.40 ppm (Si—CH$_2$—C$\underline{H}_2$—CH$_2$—N, 4H), 1.21 ppm (C$\underline{H}_3$—CH$_2$—O, 12H), 0.58 ppm (Si—C$\underline{H}_2$—CH$_2$—CH$_2$—N, 4H)

Compound (M-10)

$^1$H-NMR (solvent: CDCl$_3$) chemical shift δ: 7.73 to 7.35 ppm (hydrogen on thiophene ring, 4H), 7.50 ppm (N=C$\underline{H}$—Th, 2H), 3.83 ppm (CH$_3$—C$\underline{H}_2$—O, 8H), 1.49 ppm (Si—CH$_2$—CH$_2$—C$\underline{H}_2$—N, 4H), 1.40 ppm (Si—CH$_2$—C$\underline{H}_2$—N, 4H), 1.21 ppm (C$\underline{H}_3$—CH$_2$—O, 12H), 0.58 ppm (Si—C$\underline{H}_2$—CH$_2$—CH$_2$—N, 4H)

TABLE 1

| Compound [M] | Aldehyde compound or hydroxyl group-containing compound | | Amine compound | |
|---|---|---|---|---|
| | Compound name | Charged amount | Compound name | Charged amount |
| Example 1A M-1 | terephthalaldehyde | 4.55 g | 3-aminopropyltriethoxysilane | 15.02 g |
| Example 2A M-2 | terephthalaldehyde | 4.55 g | 3-aminopropylmethyldiethoxysilane | 12.98 g |
| Example 3A M-3 | isophthalaldehyde | 4.55 g | 3-aminopropyltriethoxysilane | 15.02 g |
| Example 4A M-4 | isophthalaldehyde | 4.55 g | 3-aminopropylmethyldiethoxysilane | 12.98 g |
| Example 5A M-5 | phthaldialdehyde | 4.55 g | 3-aminopropyltriethoxysilane | 15.02 g |
| Example 6A M-6 | phthaldialdehyde | 4.55 g | 3-aminopropylmethyldiethoxysilane | 12.98 g |
| Example 7A M-7 | terephthalaldehyde | 4.55 g | 3-aminopropyltriethoxysilane | 7.51 g |
| | | | 3-aminopropylmethyldiethoxysilane | 6.49 g |
| Example 8A M-8 | 2,4-pyridinecarboxyaldehyde | 4.58 g | 3-aminopropyltriethoxysilane | 15.02 g |
| Example 9A M-9 | 2,5-diformylfuran | 4.21 g | 3-aminopropyltriethoxysilane | 15.02 g |
| Example 10A M-10 | 2,2'-bithiophene-5,5'-dicarboxyaldehyde | 7.54 g | 3-aminopropyltriethoxysilane | 15.02 g |
| Example 11A M-11 | glutaraldehyde | 3.40 g | 3-aminopropyltriethoxysilane | 15.02 g |
| Example 12A M-12 | 1,3,5-benzenetricarboaldehyde | 5.50 g | 3-aminopropyltriethoxysilane | 22.53 g |
| Example 13A M-13 | 4-(triethoxysilyl)butanal | 23.85 g | tris(2-aminoethyl)amine | 4.96 g |

Synthesis and Evaluation of Modified Conjugated Diene-Based Polymer

Comparative Example 1 Synthesis of Modified Diene-Based Polymer i and Physical Properties Thereof Into an autoclave reactor of an inner volume of 5 L which was purged with nitrogen were charged 2,000 g of cyclohexane, 31.6 g of tetrahydrofuran, 122 g of styrene, and 320 g of 1,3-butadiene. After the temperature of the content of the reactor was regulated to 10° C., 4.75 mmol of n-butyllithium was added as a polymerization initiator to initiate polymerization. The polymerization was performed under adiabatic conditions and the maximum temperature reached 85° C. At the time when the polymerization conversion reached 99% (after 20 minutes from the polymerization initiation), 10 g of 1,3-butadiene had been being added for 2 minutes and thereafter 4.08 mmol of N,N-bis(trimethylsilyl)aminopropylmethyldiethoxysilane was added, followed by reaction for 15 minutes.

To the resulting polymer solution containing a modified conjugated diene-based polymer was added 3.96 g of 2,6-di-tert-butyl-p-cresol. Then, desolventinization was performed by steam stripping and drying was performed with a hot roll controlled to 110° C., thereby obtaining a modified conjugated diene-based polymer i. Various physical properties and the like of the resulting modified conjugated diene-based polymer i are shown in the following Table 3.

Comparative Example 2 Synthesis of Modified Conjugated Diene-Based Polymer ii and Physical Properties Thereof Polymerization was performed in the same manner as in the case of the modified conjugated diene-based polymer i except that the organosilane represented by the following formula (A) was added instead of N,N-bis(trimethylsilyl)aminopropylmethyldiethoxysilane, and solvents were removed from the resulting solution to isolate a polymer as in the case of the modified conjugated diene-based polymer i, thereby obtaining a modified conjugated diene-based polymer ii. Various physical properties and the like of the resulting modified conjugated diene-based polymer ii are shown in the following Table 3.

[Chem 9]

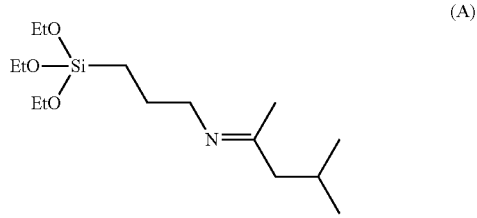

(A)

Comparative Example 3 Synthesis of Modified Conjugated Diene-Based Polymer iii and Physical Properties Thereof Polymerization was performed in the same manner as in the case of the modified conjugated diene-based polymer i except that 2.12 mmol of tetraglycidyl-1,3-bisaminomethylcyclohexane was added instead of N,N-bis(trimethylsilyl)aminopropylmethyldiethoxysilane, and solvents were removed from the resulting solution to isolate a polymer as in the case of the modified conjugated diene-based polymer i, thereby obtaining a modified conjugated diene-based polymer iii. Various physical properties and the like of the resulting modified conjugated diene-based polymer iii are shown in the following Table 3.

Comparative Example 4 Synthesis of Modified Conjugated Diene-Based Polymer iv and Physical Properties Thereof Polymerization was performed in the same manner as in the case of the modified conjugated diene-based polymer i except that 2.12 mmol of silicon tetrachloride was added instead of N,N-bis(trimethylsilyl)aminopropylmethyldiethoxysilane, and solvents were removed from the resulting solution to isolate a polymer as in the case of the modified conjugated diene-based polymer i, thereby obtaining a modified conjugated diene-based polymer iv. Various physical properties and the like of the resulting modified conjugated diene-based polymer iv are shown in the following Table 3.

Comparative Example 5 Synthesis of Conjugated Diene-Based Polymer v and Physical Properties Thereof Polymerization was performed in the same manner as in the case of the modified conjugated diene-based polymer i except that an excess amount of methanol was added instead of N,N-bis(trimethylsilyl)aminopropylmethyldiethoxysilane, and solvents were removed from the resulting solution to isolate a polymer as in the case of the modified conjugated diene-based polymer i, thereby obtaining a modified conjugated diene-based polymer v. Various physical properties and the like of the resulting modified conjugated diene-based polymer v are shown in the following Table 3.

Example 1 Synthesis of Modified Conjugated Diene-Based Polymer I and Physical Properties Thereof Polymerization was performed in the same manner as in the case of the modified conjugated diene-based polymer i except that 2.12 mmol of the compound (M-1) was added instead of N,N-bis(trimethylsilyl)aminopropylmethyldiethoxysilane, and solvents were removed from the resulting solution to isolate a polymer as in the case of the modified conjugated diene-based polymer i, thereby obtaining a modified conjugated diene-based polymer I. Various physical properties and the like of the resulting modified conjugated diene-based polymer I are shown in the following Table 2.

Examples 2 and 3 Synthesis of Modified Conjugated Diene-Based Polymers II and III and Physical Properties Thereof Polymerization was performed in the same manner as in the case of the modified conjugated diene-based polymer I except that the amounts of the modifier to be added were changed to 1.43 mmol and 1.10 mmol, respectively, and solvents were removed from the resulting solution to isolate polymers as in the case of the modified conjugated diene-based polymer i, thereby obtaining a modified conjugated diene-based polymers II and III. Various physical properties and the like of the resulting modified conjugated diene-based polymers II and III are shown in the following Table 2.

Example 4 Synthesis of Modified Conjugated Diene-Based Polymer IV and Physical Properties Thereof Polymerization was performed in the same manner as in the case of the modified conjugated diene-based polymer I except that the amount of the polymerization initiator was changed to 6.00 mmol and the amount of the modifier to be added was changed to 1.43 mmol, and solvents were removed from the resulting solution to isolate a polymer as in the case of the modified conjugated diene-based polymer i, thereby obtaining a modified conjugated diene-based polymer IV. Various physical properties and the like of the resulting modified conjugated diene-based polymer IV are shown in the following Table 2.

Example 5 Synthesis of Modified Conjugated Diene-Based Polymer V and Physical Properties Thereof Polymerization was performed in the same manner as in the case of the modified conjugated diene-based polymer I except that the amount of the polymerization initiator was changed to 3.37 mmol and the amount of the modifier to be added was changed to 1.10 mmol, and solvents were removed from the resulting solution to isolate a polymer as in the case of the modified conjugated diene-based polymer i, thereby obtaining a modified conjugated diene-based polymer V. Various physical properties and the like of the resulting modified conjugated diene-based polymer V are shown in the following Table 2.

Example 6 Synthesis of Modified Conjugated Diene-Based Polymer VI and Physical Properties Thereof Polymerization was performed in the same manner as in the case of the modified conjugated diene-based polymer I except that piperidine was further charged into the autoclave reactor of an inner volume of 5 L which was purged with nitrogen so that the amount of a polymerization initiator (a compound represented by the following formula (INI-1)) to be used became 4.75 mmol, and solvents were removed from the resulting solution to isolate a polymer as in the case of the modified conjugated diene-based polymer i, thereby obtaining a modified conjugated diene-based polymer VI. Various physical properties and the like of the resulting modified conjugated diene-based polymer VI are shown in the following Table 2.

[Chem 10]

(INI-1)

Examples 7 to 16 Synthesis of Modified Conjugated Diene-Based Polymers VII to XVI and Physical Properties Thereof Polymerization was performed in the same manner as in the case of the modified conjugated diene-based polymer I except that the compounds (M-2) to (M-11) described in the following Tables 2 and 3 were added, respectively, instead of the compound (M-1), and solvents were removed from the resulting solution to isolate polymers as in the case of the modified conjugated diene-based polymer i, thereby obtaining modified conjugated diene-based polymers VII to XVI. Various physical properties and the like of the resulting modified conjugated diene-based polymers VII to XVI are shown in the following Tables 2 and 3. In Example 16, a compound in which "$R^7$" in the above formula (M-11) is a hydrogen atom was used as a modifier.

Example 17 Synthesis of Modified Conjugated Diene-Based Polymer XVII and Physical Properties Thereof Polymerization was performed in the same manner as in the case of the modified conjugated diene-based polymer I except that 1.43 mmol of the compound (M-12) was added instead of the compound (M-1), and solvents were removed from the resulting solution to isolate a polymer as in the case of the modified conjugated diene-based polymer i, thereby obtaining a modified conjugated diene-based polymer XVII. Various physical properties and the like of the resulting modified conjugated diene-based polymer XVII are shown in the following Table 3.

Example 18 Synthesis of Modified Conjugated Diene-Based Polymer XVIII and Physical Properties Thereof Polymerization was performed in the same manner as in the case of the modified conjugated diene-based polymer I except that 1.43 mmol of the compound (M-13) was added instead of the compound (M-1), and solvents were removed from the resulting solution to isolate a polymer as in the case of the modified conjugated diene-based polymer i, thereby obtaining a modified conjugated diene-based polymer XVIII. Various physical properties and the like of the resulting modified conjugated diene-based polymer XVIII are shown in the following Table 3.

Example 19 Synthesis of Modified Conjugated Diene-Based Polymer XIX and Physical Properties Thereof Polymerization was performed in the same manner as in the case of the modified conjugated diene-based polymer I except that 2.12 mmol of a 1:1 (molar ratio) mixture of the compound (M-1) and the compound (M-2) was added, and solvents were removed from the resulting solution to isolate a polymer as in the case of the modified conjugated diene-based polymer i, thereby obtaining a modified conjugated diene-based polymer XIX. Various physical properties and the like of the resulting modified conjugated diene-based polymer XIX are shown in the following Table 3.

TABLE 2

| | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Polymerization formulation: | | | | | | | | | | | | |
| Kind of modifier/coupling agent | M-1 | M-1 | M-1 | M-1 | M-1 | M-1 | M-2 | M-3 | M-4 | M-5 | M-6 | M-7 |
| Amount of modifier to be added | 2.12 | 1.43 | 1.10 | 1.43 | 1.10 | 2.12 | 2.12 | 2.12 | 2.12 | 2.12 | 2.12 | 2.12 |
| Amount of modifier/amount of active Li (molar ratio) | 0.52 | 0.36 | 0.27 | 0.28 | 0.45 | 0.53 | 0.54 | 0.53 | 0.55 | 0.54 | 0.53 | 0.50 |
| Polymerization initiator | n-BuLi | n-BuLi | n-BuLi | n-BuLi | n-BuLi | INI-1 | n-BuLi | n-BuLi | n-BuLi | n-BuLi | n-BuLi | n-BuLi |
| Properties of modified conjugated diene-based polymer: | | | | | | | | | | | | |
| Name of polymer | I | II | III | IV | V | VI | VII | VIII | IX | X | XI | XII |
| Vinyl content (%) | 55 | 56 | 57 | 56 | 56 | 56 | 56 | 56 | 57 | 56 | 56 | 56 |
| Bound styrene content (%) | 26 | 26 | 26 | 27 | 26 | 26 | 27 | 26 | 26 | 26 | 26 | 26 |

TABLE 2-continued

|  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Peak molecular weight before modification reaction ($\times 10^4$) | 20 | 20 | 20 | 15 | 33 | 20 | 20 | 20 | 21 | 20 | 20 | 19 |
| Weight average molecular weight ($\times 10^4$) | 66 | 61 | 60 | 63 | 89 | 66 | 39 | 56 | 35 | 45 | 25 | 52 |
| Coupling ratio of three branches or more (%) | 77 | 81 | 80 | 85 | 64 | 79 | 13 | 53 | 9 | 40 | 5 | 58 |
| Mooney viscosity (ML1 + 4, 100° C.) | 69 | 67 | 66 | 51 | 105 | 69 | 58 | 68 | 50 | 65 | 46 | 57 |
| Cold flow (C./F.) | 0.1 | 0.1 | 0.1 | 0.1 | 0.1 | 0.1 | 3.3 | 0.5 | 3.7 | 1.0 | 4.0 | 0.4 |

TABLE 3

|  | Example 13 | Example 14 | Example 15 | Example 16 | Example 17 | Example 18 | Example 19 | Comparative Example 1 | Comparative Example 2 | Comparative Example 3 | Comparative Example 4 | Comparative Example 5 |
|---|---|---|---|---|---|---|---|---|---|---|---|---|
| Polymerization formulation: |  |  |  |  |  |  |  |  |  |  |  |  |
| Kind of modifier/coupling agent | M-8 | M-9 | M-10 | M-11 | M-12 | M-13 | M-1/M-2 | Modifier 1 | Modifier 2 | Modifier 3 | SiCl$_4$ | — |
| Amount of modifier to be added | 2.12 | 2.12 | 2.12 | 2.12 | 1.43 | 1.43 | 2.12 | 4.08 | 4.08 | 2.12 | 2.12 | — |
| Amount of modifier/amount of active Li (molar ratio) | 0.53 | 0.53 | 0.54 | 0.55 | 0.35 | 0.35 | 0.55 | 1.00 | 1.00 | 0.52 | 0.52 | — |
| Polymerization initiator | n-BuLi | n-BuLi | n-BuLi | n-BuLi | n-BuLi | n-BuLi | n-BuLi | n-BuLi | n-BuLi | n-BuLi | n-BuLi | n-BuLi |
| Properties of modified conjugated diene-based polymer: |  |  |  |  |  |  |  |  |  |  |  |  |
| Name of polymer | XIII | XIV | XV | XVI | XVII | XVIII | XIX | i | ii | iii | iv | v |
| Vinyl content (%) | 56 | 56 | 56 | 55 | 56 | 56 | 55 | 57 | 56 | 56 | 56 | 56 |
| Bound styrene content (%) | 27 | 26 | 27 | 26 | 26 | 26 | 26 | 27 | 26 | 27 | 26 | 27 |
| Peak molecular weight before modification reaction ($\times 10^4$) | 20 | 19 | 20 | 21 | 20 | 20 | 21 | 20 | 20 | 20 | 20 | 20 |
| Weight average molecular weight ($\times 10^4$) | 65 | 60 | 70 | 66 | 71 | 73 | 58 | 20 | 30 | 67 | 60 | 20 |
| Coupling ratio of three branches or more (%) | 75 | 70 | 78 | 78 | 75 | 78 | 60 | 3.5 | 12 | 73 | 62 | 1 |
| Mooney viscosity (ML1 + 4, 100° C.) | 68 | 65 | 69 | 66 | 74 | 76 | 62 | 42 | 56 | 67 | 64 | 40 |
| Cold flow (C./F.) | 0.1 | 0.1 | 0.1 | 0.1 | 0.1 | 0.1 | 0.3 | 10 or more | 3.0 | 0.3 | 0.3 | 10 or more |

In Tables 2 and 3, abbreviations of the compounds are as follows:

INI-1: a reaction product between n-butyllithium and piperidine (compound represented by the aforementioned formula (INI-1)

Modifier 1: N,N-bis(trimethylsilyl)aminopropylmethyldiethoxysilane

Modifier 2: a compound represented by the aforementioned formula (A)

Modifier 3: tetraglycidyl-1,3-bisaminomethylcyclohexane

[Production of Blended Rubber and Vulcanized Rubber]

Each component, including each of the modified conjugated diene-based polymers (unmodified in Comparative Example 5) produced above, was blended according to the blending formulation shown in the following Table 4 and they were kneaded to thereby produce a blended rubber. The kneading was performed by the following method. Using a plastomill (internal volume: 250 ml) equipped with a temperature controller, in first-stage kneading, the modified conjugated diene-based polymer (unmodified in Comparative Example 5), the butadiene rubber, the extender oil, silica, carbon black, the silane coupling agent, stearic acid, the antioxidant, and zinc oxide were blended, and kneaded at a filling rate of 72% and a rotational speed of 60 rpm. Then, after cooling the above-obtained blend to room temperature, in second-stage kneading, sulfur and the vulcanization accelerant were blended into the blend, followed by kneading. The resulting blend was then molded, and vulcanized at 160° C. for a given time using a vulcanizing press to obtain a crosslinked rubber (vulcanized rubber).

Using the resulting blended rubber and vulcanized rubber, processability, rolling resistance (low heat build-up), and abrasion resistance were evaluated by performing blend Mooney viscosity measurement, 70° C. tan δ measurement, and DIN abrasion test. The evaluation results are shown in the following Table 5. Incidentally, measurement results of the blend Mooney viscosity, 70° C. tan δ, and DIN abrasion test are indicated as indices where the result of Comparative Example 5 is taken as 100, respectively.

TABLE 4

| Blending formulation | (phr) |
|---|---|
| Modified conjugated diene-based polymer | 70 |
| Butadiene rubber *1 | 30 |
| Extender oil *2 | 37.5 |
| Silica *3 | 70 |
| Carbon black *4 | 5.6 |
| Silane coupling agent *5 | 5.6 |
| Stearic acid | 2 |
| Aging preventive *6 | 1 |
| Zinc oxide | 3 |
| Vulcanization accelerant D *7 | 1.5 |
| Vulcanization accelerant CZ *8 | 1.8 |
| Sulfur | 1.5 |

In Table 4, for individual components, the trade names used are as follows:
*1: BR01 manufactured by JSR Corporation,
*2: JOMO Process NC-140 manufactured by Japan Energy Corporation,
*3: ZEOSIL 1165MP manufactured by Rhodia,
*4: DIABLACKN339 manufactured by Mitsubishi Chemical Corporation,
*5: Si75 manufactured by Evonik,
*6: OZONONE 6C manufactured by Seiko Chemical Co., Ltd.,
*7: NOCCELER D manufactured by Ouchi Shinko Chemical Industrial Co., Ltd.,
*8: NOCCELER CZ manufactured by Ouchi Shinko Chemical Industrial Co., Ltd.

Moreover, the Mooney viscosity and cold flow values of the modified conjugated diene-based polymers obtained in Examples 1 to 19 were about the same levels as the results of Comparative Examples 2, 3 and 4.

With regard to the processability of the blended rubbers and the tire physical properties (rolling resistance, abrasion resistance) of the vulcanized rubbers obtained in Examples 1 to 19, as compared with Comparative Example 1, the processability and the rolling resistance were about the same levels but the abrasion resistance was more excellent in the rubbers of Examples. Moreover, as compared with Comparative Examples 2 to 4, the abrasion resistance was about the same level but the processability and the rolling resistance were more excellent in those of Examples. In addition, as compared with Comparative Example 5, those of Examples were more excellent in the processability, rolling resistance, and abrasion resistance.

From the above, it was confirmed that, based on the method for producing a modified conjugated diene-based polymer of the present disclosure in which the compound [M] is used as a modifier, the modified conjugated diene-based polymer having high Mooney viscosity and excellent shape stability can be produced and the modified conjugated diene-based polymer maintains processability as a blended rubber and low heat build-up and abrasion resistance as a vulcanized rubber.

The invention claimed is:

1. A method for producing a modified conjugated diene-based polymer, the method comprising:

TABLE 5

| Properties | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Processability Blend Moony viscosity (index) | 114 | 115 | 117 | 118 | 113 | 122 | 114 | 113 | 116 | 114 | 117 | 116 |
| Rolling resistance 70° C. tan δ (index) | 123 | 124 | 126 | 127 | 120 | 132 | 123 | 122 | 126 | 124 | 127 | 127 |
| Abrasion resistance DIN abrasion test (index) | 113 | 115 | 114 | 113 | 119 | 110 | 106 | 116 | 107 | 113 | 108 | 113 |

| Properties | Example 13 | Example 14 | Example 15 | Example 16 | Example 17 | Example 18 | Example 19 | Comparative Example 1 | Comparative Example 2 | Comparative Example 3 | Comparative Example 4 | Comparative Example 5 |
|---|---|---|---|---|---|---|---|---|---|---|---|---|
| Processability Blend Moony viscosity (index) | 115 | 115 | 113 | 112 | 111 | 112 | 114 | 115 | 109 | 108 | 98 | 100 |
| Rolling resistance 70° C. tan δ (index) | 125 | 124 | 123 | 123 | 120 | 121 | 124 | 122 | 113 | 116 | 97 | 100 |
| Abrasion resistance DIN abrasion test (index) | 115 | 116 | 112 | 117 | 118 | 117 | 113 | 103 | 113 | 114 | 117 | 100 |

All of the modified conjugated diene-based polymers obtained in Examples 1 to 19 showed high Mooney viscosity and low values of cold flow as compared with the modified conjugated diene-based polymer having small number of branches obtained in Comparative Example 1 or the unmodified conjugated diene-based polymer obtained in Comparative Example 5. From these results, it was found that the modified conjugated diene-based polymers obtained in Examples 1 to 19 were more excellent in shape stability (storage stability) than the modified conjugated diene-based polymer having small number of branches obtained in Comparative Example 1 and the unmodified conjugated diene-based polymer obtained in Comparative Example 5.

reacting a conjugated diene-based polymer having an active chain end, obtained by polymerizing a monomer comprising a conjugated diene compound in the presence of an initiator that comprises at least either of an alkali metal compound or an alkaline earth metal compound, with a compound [M] having at least two groups selected from the group consisting of a group "—C($R^1$)=N-$A^1$" and a group "—N=C($R^1$)-$A^1$", where $R^1$ is a hydrogen atom or a hydrocarbyl group and $A^1$ is a monovalent group having an alkoxysilyl group.

2. The method according to claim 1, wherein the compound [M] is a compound of formula (1):

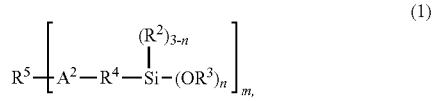

wherein $R^2$ and $R^3$ are each independently a hydrocarbyl group having 1 to 20 carbon atoms,
$R^4$ is an alkanediyl group having 1 to 20 carbon atoms, and
$A^2$ is a group "*—C($R^1$)=N—" or a group "*—N=C($R^1$)—", where $R^1$ is a hydrogen atom or a hydrocarbyl group and "*" represent a bond to $R^5$;
$R^5$ is an m-valent hydrocarbyl group having 1 to 20 carbon atoms or an m-valent group having 1 to 20 carbon atoms, which has at least one atom selected from the group consisting of a nitrogen atom, an oxygen atom, and a sulfur atom and does not have an active hydrogen;
n is an integer of 1 to 3 and
m is an integer of 2 to 10; and
a plurality of $R^2$, $R^3$, $R^4$, $A^2$, and n are optionally the same or different.

3. The method according to claim 1, wherein, on a gel permeation chromatography (GPC) curve obtained from measurement by GPC after the reacting, an area of peak portion(s) showing 2.5 times or more peak top molecular weight than a peak top molecular weight at a peak having a smallest molecular weight is 40% or more of a total peak area of the GPC curve.

4. The method according to claim 1, wherein a peak top molecular weight at a peak having a smallest molecular weight measured by gel permeation chromatography (GPC) after the reacting is from $5.0\times10^4$ to $1.0\times10^6$.

5. The method according to claim 1, wherein the monomer further comprises an aromatic vinyl compound.

6. The method according to claim 1, wherein the monomer is polymerized with a mixture of at least either of an alkali metal compound or an alkaline earth metal compound and a compound having a functional group that interacts with silica, as the initiator.

7. A modified conjugated diene-based polymer, comprising: a conjugated diene-based polymer having an active chain end and a compound [M] having at least two groups selected from the group consisting of a group "—C($R^1$)=N-$A^1$" and a group "—N=C($R^1$)-A", where $R^1$ is a hydrogen atom or a hydrocarbyl group and $A^1$ is a monovalent group having an alkoxysilyl group,
wherein the modified conjugated diene-based polymer is a reaction product between the conjugated diene-based polymer and the compound [M].

8. A modified conjugated diene-based polymer of formula (3):

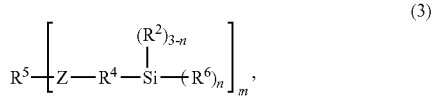

wherein $R^2$ is a hydrocarbyl group having 1 to 20 carbon atoms, $R^6$ is a hydrocarbyloxy group having 1 to 20 carbon atoms or a modified or unmodified conjugated diene-based polymer chain, $R^4$ is an alkanediyl group having 1 to 20 carbon atoms, and Z is a group represented by the following formula (4) or (5), $R^5$ is an m-valent hydrocarbyl group having 1 to 20 carbon atoms or an m-valent group having 1 to 20 carbon atoms, which has at least one atom selected from the group consisting of a nitrogen atom, an oxygen atom, and a sulfur atom and does not have an active hydrogen; n is an integer of 1 to 3 and m is an integer of 2 to 10, and a plurality of $R^2$, $R^4$, $R^6$, Z, and n are optionally the same or different:

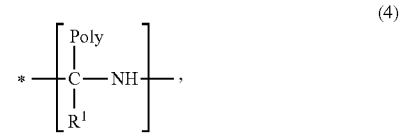

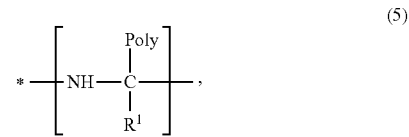

wherein $R^1$ is a hydrogen atom or a hydrocarbyl group and Poly is a modified or unmodified conjugated diene-based polymer chain; and "*" represents a bond to $R^5$.

9. A polymer composition, comprising:
a modified conjugated diene-based polymer obtained by the method according to claim 1,
silica, and
a crosslinking agent.

10. A crosslinked body, comprising:
the polymer composition according to claim 9,
wherein the crosslinked body is obtained by crosslinking the polymer composition.

11. A tire, comprising:
the polymer composition according to claim 9,
wherein at least a tread of the tire or a sidewall of the tire is formed with the polymer composition.

12. A polymer composition, comprising:
the modified conjugated diene-based polymer according to claim 7, silica, and
a crosslinking agent.

13. A crosslinked body, comprising:
the polymer composition according to claim 12,
wherein the crosslinked body is obtained by crosslinking the polymer composition.

14. A tire, comprising:
the polymer composition according to claim 12,
wherein at least a tread of the tire or a sidewall of the tire is formed with the polymer composition.

15. A polymer composition, comprising:
the modified conjugated diene-based polymer according to claim 8, silica, and
a crosslinking agent.

16. A crosslinked body, comprising:
the polymer composition according to claim 15,
wherein the crosslinked body is obtained by crosslinking the polymer composition.

17. A tire, comprising:
the polymer composition according to claim 15,
wherein at least a tread of the tire or a sidewall of the tire is formed with the polymer composition.

* * * * *